Figure 1:
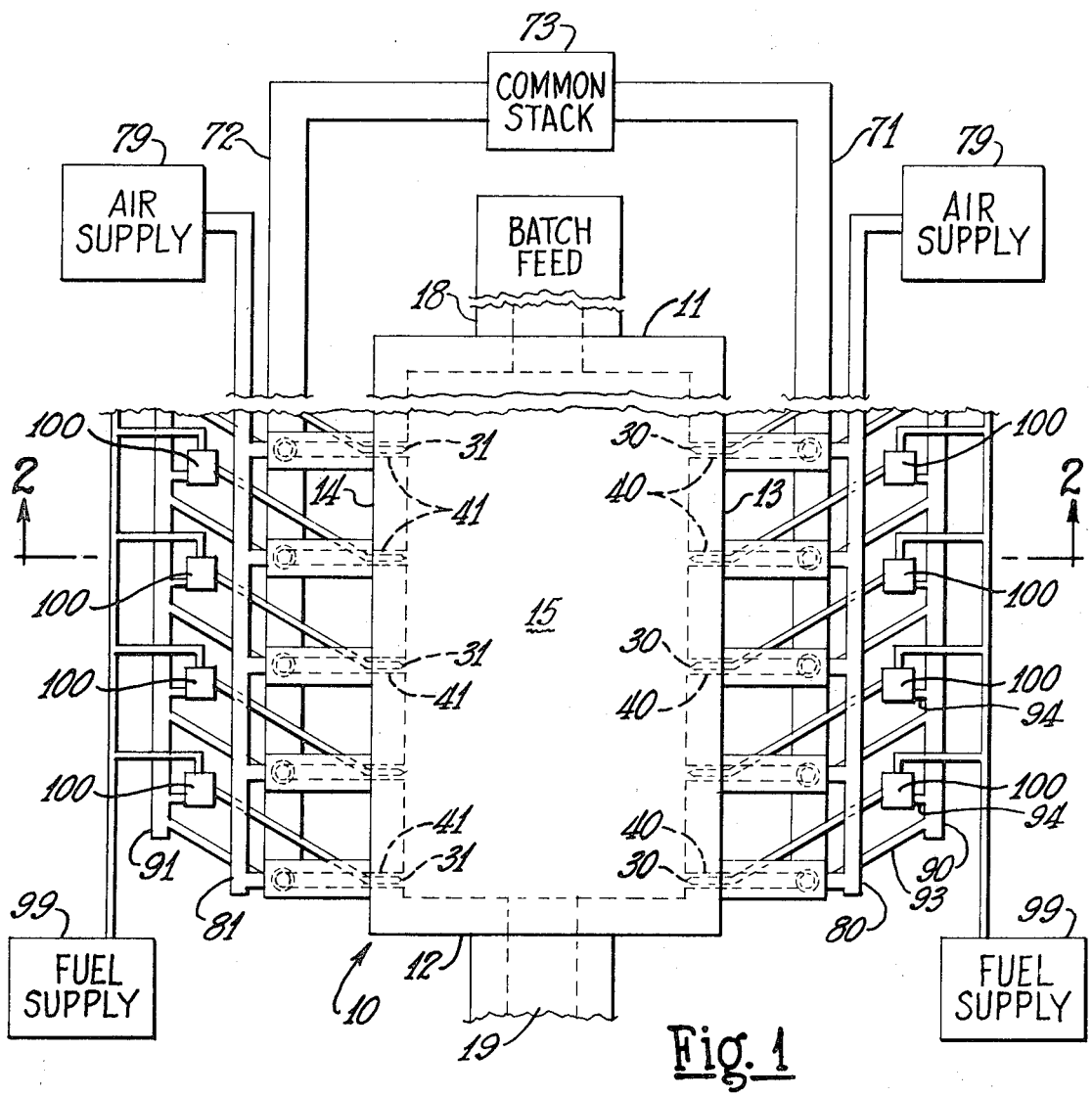

United States Patent

[11] 3,633,886

[72] Inventor Magnus L. Froberg
       Newark, Ohio
[21] Appl. No. 29,966
[22] Filed Apr. 20, 1970
[45] Patented Jan. 11, 1972
[73] Assignee Owens-Corning Fiberglas Corporation

[54] HEATING FURNACES
     16 Claims, 2 Drawing Figs.
[52] U.S. Cl. .................................................. 263/15 R,
                                                        263/20
[51] Int. Cl. ..................................................... F23l 15/04
[50] Field of Search ........................................... 263/20, 15
                                                             R

[56] References Cited
           UNITED STATES PATENTS
1,661,836  3/1928  Kutchka et al................. 263/15

3,476,368  11/1969  Saiki............................. 263/20

Primary Examiner—John J. Camby
Attorney—Staelin & Overman

ABSTRACT: A furnace having sidewalls, end walls, a top wall and a bottom wall defining a heating chamber in which material to be heated enters the heating chamber through one of the end walls and exits through the other of the end walls. A plurality of burner stations are spaced along at least one of the sidewalls. Exhaust port means for each burner station are formed in a wall above its associated burner station whereby a flow pattern for substantially the combustion products of each burner station is established from each burner station out in a first current over material in the heating chamber and up and back over the first current in a second current to the exhaust port means above that burner station. Recuperator means are provided for each exhaust port means for passing combustion products from the exhaust port means in heat exchange relationship with combustion air for the burner stations to preheat the combustion air.

INVENTOR.
MAGNUS L. FROBERG

INVENTOR.
MAGNUS L. FROBERG

HEATING FURNACES

This invention relates to heating furnaces in general and particularly to such furnaces which utilize recuperators wherein the combustion products from the burner stations are used to preheat combustion air which is to be mixed with the fuel at a burner station.

The invention will be disclosed and discussed herein in connection with heating furnaces such as those used in the glass industry, in which flue or exhaust gases are used to preheat combustion air for the furnace burners, although it will be apparent that the invention will have other uses and provide advantages in other types of furnaces.

In glass industry heating furnaces, it is necessary to burn substantial amounts of fuel with large volumes of air in order to achieve high temperatures and the large quantities of heat required for glass-melting operations. This results in large volumes of waste and flue gases, having high temperatures and heat content remaining after the primary heating use. These factors have long made it advantageous to use recuperators or regenerators to recover some of the heat of the waste gases by using the hot flue gases to preheat the combustion air and thus increase the output of the furnace for a given amount of fuel consumption.

In recent years the greatly increased cost of fuel, labor and capital equipment and the attendant necessity for close cost control in all glass-making operations, have made it important to recover as much heat as possible from the flue gases and transfer it to the incoming combustion air in order to increase the heating efficiency and thus the output of the furnace to the greatest extent possible. It is also important that furnace shutdowns for maintenance, such as repair or replacement of recuperators, be reduced to a minimum. While new furnace installations are designed and built with these factors in mind, great efforts are also being made to increase the efficiencies and outputs of existing furnaces because of the high cost of new furnaces and long times required to build and put them into operation; an increased recovery of otherwise wasted heat and flue gases being one of the most effective and economical approaches toward achieving increases in efficiency and output of old furnaces.

For these reasons, if recuperators are employed it is desirable to not only provide high recovery of heat from flue gases, but also to provide a long service life with a minimum of maintenance and shutdown. This, however, is exceedingly difficult to achieve because of the extremely rigorous service conditions to which recuperator heat exchange elements are subjected in operation. Recuperator-type heat exchangers are desirable since the flame direction and combustion gas flow in one direction enables better and more uniform control of the temperature of the preheated combustion air. There is no interruption of firing, as in a regenerator type furnace, further enabling closer control over the furnace temperature. Substantially uniform flame temperatures in a recuperator-type furnace helps preserve the refractory on the interior of the heating chamber. Further, in most recuperator-type installations there is no clogging of checker work in stack or exhaust passages as found in regenerator-type installations.

On the other hand, regenerators are particularly useful with large furnaces since in the past the use of single or even dual-recuperator installations would have required recuperators that were too large to service the larger furnaces. Additionally, better control of the flame patterns is achieved since the flame leaves a burner station and is directed across the furnace toward exhaust ports which carry away the combustion products.

It is obviously desirable, therefore, to have a furnace which combines the advantages of both the recuperator and regenerator types of preheating combustion air. Attempts to obtain the most advantageous arrangement and in which a plurality of recuperators have been utilized are illustrated in the prior art in U.S. Pat. No. 1,864,087, issued June 21, 1932, and U.S. Pat. No. 2,004,916, issued June 11, 1935. While the structures illustrated in the above referenced patents have contributed to the art, all the problems associated with the attempt to gain the advantages of both recuperative and regenerative type of heat exchange have not been solved.

It is, therefore, an object of this invention to provide an improved heating furnace.

It is a further object of this invention to provide an improved heating furnace utilizing a plurality of recuperator units for heat exchange between hot flue gases and combustion air to be supplied to burners in the furnace.

In carrying out the above objects, the invention features in a preferred embodiment a tank-type glass-melting furnace wherein the furnace includes sidewalls, end walls, a top wall and a bottom wall defining a channel in which batch materials are melted to form a stream of molten glass that flows from a batch charge area in one end wall to a molten glass discharge area in the other end wall. A plurality of burner stations are spaced along one of the sidewalls. Exhaust port means for each burner station is formed in the one sidewall above its associated burner station and aligned therewith whereby a flow pattern for substantially all of combustion products from each burner station is established out in a first current over the glass in the heating chamber, and up and back over the first current in a second current to the exhaust port means in the sidewall above that burner station. Recuperator means are provided for each exhaust port means and include a first chamber for receiving combustion products from the exhaust port means and a second chamber in heat exchange relationship with the first chamber for preheating combustion air for the burner stations.

A common header may be connected to the second chambers of the recuperator means for supplying preheated combustion air to the burner stations. The common header is advantageously connected to supply combustion air to a burner station, substantially all of which air has been preheated by exhaust combustion products from that burner station to correlate the temperature of the preheated combustion air with the amount of heat desired to be supplied to the furnace by that burner station.

A preferred embodiment also includes a second plurality of burner stations spaced along the other of the sidewalls. Exhaust port means for each of the second plurality of burner stations are formed in the other sidewall above its associate burner station and again aligned therewith, wherewith a flow pattern for substantially all the combustion products from each of the second plurality of burner stations is established from a burner station out in a first current over the glass in the heating chamber and up and back over the first current in the second current to the exhaust port means in the sidewall above that burner station. Recuperator means are also provided for each of the exhaust port means for the second plurality of burner stations, each including a first chamber for receiving combustion products from an exhaust port means and a second chamber in heat exchange relationship with said first chamber for preheating combustion air for the burner stations.

Each of the first-mentioned plurality of burner stations is advantageously paired with and positioned substantially directly across from one of the second plurality of burner stations so that the flow patterns from each pair of burner stations define a heating zone across the channel. Control means are provided for each burner station for regulating the temperature of each of the zones.

Means are also disclosed and described for selectively blocking flow of combustion products and combustion air through each recuperator means to enable repair or maintenance thereof without shutting down the furnace.

Figure 2:
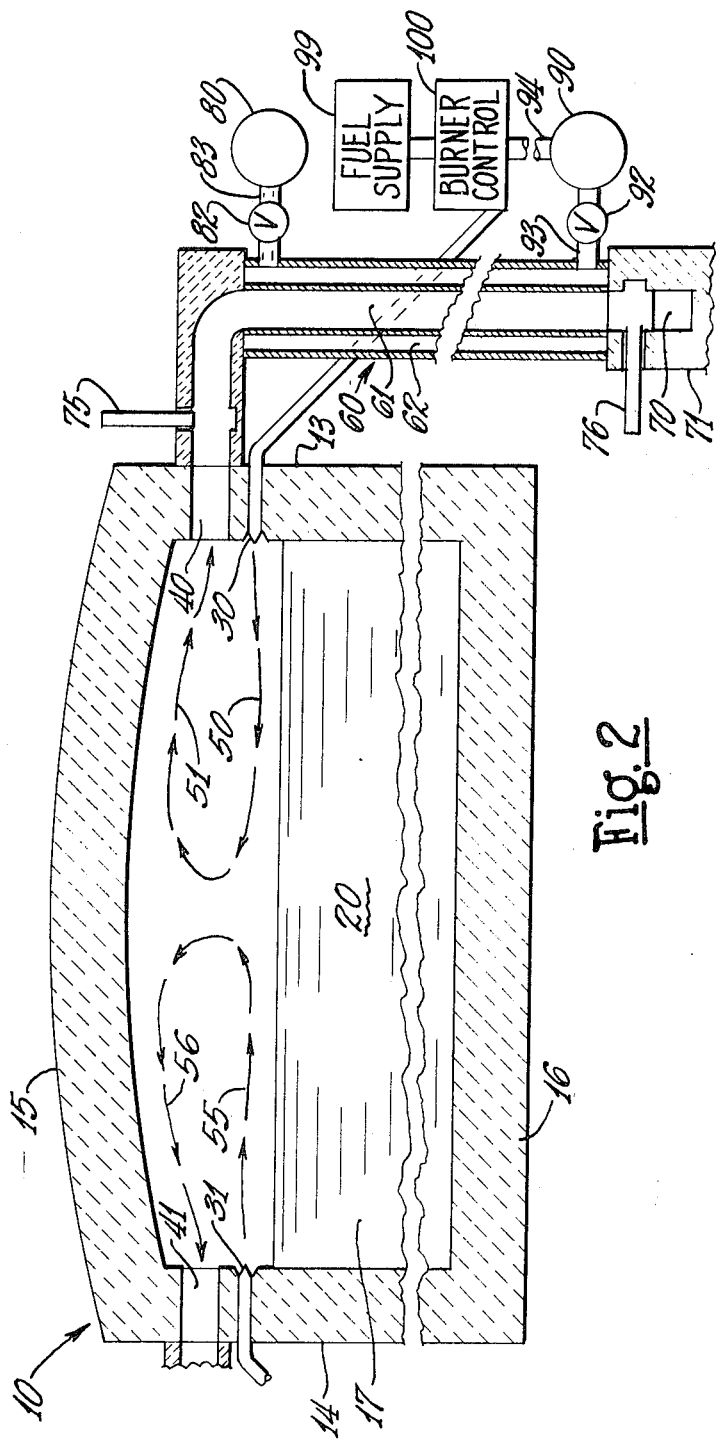

Other objects, advantages and features of this invention will become apparent from the following description when taken in conjunction with the accompanying drawings, in which:

FIG. 1 is a plan view of a heating furnace embodying the teachings of this invention; and FIG. 2 is an enlarged cross-sectional view of the apparatus illustrated in FIG. 1 taken along lines II—II.

Referring to the drawings there is illustrated a tank-type glass-melting furnace designated generally at 10 which includes sidewalls 13, 14; end walls 11, 12; a top wall 15 and a bottom wall 16 defining a channel 17 in which batch materials are melted to form a stream of molten glass 20 that flows from a batch charge area 18 in one end wall to a molten glass discharge area 19 in the other end wall.

A plurality of burner stations 30 are spaced along sidewall 13. Exhaust port means 40 for each burner station 30 is formed in the sidewall 13 above its associated burner station and aligned therewith whereby a flow pattern (best seen in FIG. 2) for substantially all of the combustion products from a burner station 30 is established in a first current 50 out over the glass 20 in the heating chamber and up and back over the first current 50 in a second current 51 to the associated exhaust port 40 in the sidewall 13 above a burner station 30.

A burner station may include one or more burner nozzles. Exhaust port means 40 may include one or more ports formed in the sidewall 13. However, the burner stations and exhaust ports must cooperate to provide the flow pattern as set forth hereinbefore.

A recuperator means generally indicated at 60 is provided for each exhaust port 40 and includes a first chamber 61 for receiving combustion products from the exhaust port 40 and a second chamber 62 in heat exchange relationship with the first chamber 61 for preheating combustion air for the burner stations 30.

Combustion air is provided for preheating from a supply 79 and is routed via a common header 80 through individual valves 82 and conduits 83 to the chamber 62. After being heated the combustion air exits from chamber 62 via individual conduit 93 and valve 92 to a common header 90. Preheated combustion air from the common header 90 is supplied via individual conduits 94 to a burner control 100 for each burner station 30. Fuel from a fuel supply 99 is also provided to the burner control 100 to be mixed in the ratio desired with the preheated combustion air.

The common header 90 is connected to the second chamber 62 of all of the recuperators 60. The common header 90 is advantageously connected to supply combustion air to a burner station, substantially all of which air has been preheated by exhaust combustion products from that burner station to correlate the temperature of the preheated combustion air with the amount of heat desired to be supplied to the furnace by that burner station. This is accomplished by placing an inlet 93 to header 90 closely adjacent to a supply conduit 94 from header 90 for an associated burner station-exhaust port combination.

The furnace illustrated in the drawings further includes a second plurality of burner stations 31 spaced along the other sidewall 14. Exhaust port means 41 for each of the second plurality of burner stations 31 is formed in the other sidewall 14 above its associated burner station and aligned therewith whereby a flow pattern for substantially all of the combustion products from each of the second plurality of burner stations 31 is established out in a first current 55 over the glass 20 in the heating chamber, and up and back over the first current 55 in a second current 56 to the exhaust port means 41 in the sidewall 14 above a burner station 31. Recuperator means are provided for each of the exhaust ports 41 for each of the second plurality of burner stations 31 which are substantially identical to the recuperator stations generally indicated at 60. Combustion air is routed from an air supply 79 via a common header 81 to the recuperators. After the combustion air is heated it is directed through a common header 91 to the individual burner stations in the same manner as illustrated and described hereinbefore for the burner stations on the other side of the furnace.

The exhaust combustion products from ports 40 and 41, after traveling through chamber 61 of recuperator 60, is directed via common header or canals such as indicated at 70 which may be formed in refractory such as illustrated at 71 and 72 to a common stack 73.

Each of the first-mentioned plurality of burner stations 30 is advantageously paired with and positioned substantially directly across from one of the second plurality of burner stations 31 so that the flow patterns from each pair of burner stations defines a heating zone across the channel 17. The burner control means 100 for each of the pair of burner stations 30, 31 may thus be utilized for regulating the temperature and the pressure in each of the zones established by the flow patterns.

Referring to FIG. 2 there is illustrated means for selectively blocking flow of exhaust combustion products and combustion air through each of the recuperator means to enable repair or maintenance thereof without shutting down a furnace. A first gate or valve means 75 is provided to block flow from an exhaust port 40 into a recuperator. A second gate or valve means 76 is provided to block backflow from the common exhaust canal 70 back up into a recuperator 60 which is being repaired. The valve 82 may be utilized to block flow from the common header 80 of combustion air to be preheated while the valve 92 may be utilized to block the backflow from the common header 90 which is supplying preheated combustion air to the burner controls 100.

By blocking off an individual recuperator means as described above furnace operation may continue, since combustion air is being supplied from the common header 90 to all burner controls and since the combustion products from the burner station will be temporarily diverted to other exhaust port means. Thus an additional recuperator may be repaired or replaced without shutting down the operation of the furnace.

By installing a plurality of smaller recuperators in each of the exhaust ports of the furnace the required volume of combustion air for a large furnace may be provided. Thus the necessity for huge recuperators is avoided while obtaining the advantages of the recuperator. Further, by having a plurality of smaller recuperators to accept the required volume of combustion air the heat exchange surfaces available for preheating the combustion air are increased by a factor of three, in the apparatus illustrated, to enable a more efficient heat exchange. Still further, since the recuperators are installed closely adjacent the furnace, the temperature of the combustion products is higher and so an additional efficiency is obtained.

As noted before, there is an increased ability to control temperature and pressure within a designated zone because of the flow patterns that have been established by the structure described.

In the past exhaust combustion gases have flowed over the full length of the furnace to one or two larger exhaust ports. This tended to pick up the dust and finer particles from the batch material that is being charged at area 18, carrying the batch materials out the stack with the exhaust gases. With the present system each exhaust port combines with a burner station to set up a zone flow. Thus only the first few zones would be exposed to batch, the remainder of the zones being over glass that is already melted. In addition, since the flow patterns established by the current 50, 55 and 51, 56 meet substantially in the middle of the furnace and go upwardly and backwardly the batch that may be picked up is generally dropped out of the current when the flow pattern reverses direction.

It is desirable to have a "hotspot" zone to restrict batch flow from floating on top of the pool of molten glass toward the discharge end 19 of the furnace. As noted hereinbefore the temperatures of each of the zones may be selectively regulated because of the flow patterns that have been established, thus enabling the furnace to have a "hotspot" zone wherever desired.

Since the flame patterns are individual the batch pickup or batch carryover is reduced, thereby keeping an advantage of a regenerative furnace while gaining the advantage of a recuperator. The flow patterns described enable the establishment of a more uniform overall pressure and temperature gradient in the furnace. This avoids the pressure gradient across the furnace in a regenerator. Better stability is provided since each recuperator is smaller and thus provides better control for each zone. In addition, since the flow of the flame goes out over the glass and then doubles back above itself, it insulates the refractory of the crown or roof from the direct heat of the flame. Although the invention is particularly applicable to larger furnaces, the better control provided by the flow patterns described make it useful in small furnaces as well.

The invention hereinbefore described also enables conversion of a regenerator-type furnace to a recuperator-type furnace as shown, with a minimum of construction change in the furnace itself. The melting tank and ports of the regenerator furnace would remain undisturbed. The regenerators would be dismantled down to the rider arch and canal for exhaust gases. A recuperator would then be installed to connect the ports to the canal. The burners would be installed in the walls of the furnace below the ports. Thus the existing brickwork would be left undisturbed except for the removal of the regenerators and the installation of the recuperators would provide a substantial space saving.

It should be noted that although the exhaust port means 40, 41 are shown formed in the sidewalls 13, 14, respectively, of the furnace it is possible to obtain substantially the same flow patterns shown in FIG. 2 by forming the exhaust ports in the roof 15 but closely adjacent the sidewalls 13, 14.

In conclusion, it is pointed out that while the illustrated example constitutes a practical embodiment of the invention, it is not intended to limit the invention to the exact details shown since modifications may be made without departing from the spirit and scope of the invention disclosed.

I claim:

1. A furnace including sidewalls, end walls, a top wall and a bottom wall defining a heating chamber in which material to be heated enters said heating chamber through one of said end walls and exits through the other of said end walls; a plurality of burner stations spaced along one of said sidewalls; exhaust port means for each burner station formed in a wall above its associated burner stations whereby a flow pattern for substantially all of the combustion products from each burner station is established from each burner station out in a first current over material in said heating chamber and up and back over said first current to the exhaust port means above that burner station; and recuperator means for each exhaust port means for passing combustion products from said exhaust port means in heat exchange relationship with combustion air for said burner stations.

2. Apparatus as defined in claim 1 which further includes a common header connected to all of said recuperator means for supplying preheated combustion air to said burner stations.

3. Apparatus as defined in claim 1 which further includes a second plurality of burner stations spaced along the other of said sidewalls; exhaust port means for each of said second plurality of burner stations formed in a wall above its associated burner station whereby a flow pattern for substantially all of the combustion products from each of the second plurality of burner stations is established from a burner station out in a first current over material in said heating chamber and up and back over said first current to the associated exhaust port means; and recuperator means for each of said exhaust port means for each of said second plurality of burner stations for passing combustion products from said exhaust port means in heat exchange relationship with combustion air for said burner stations.

4. Apparatus as defined in claim 3 which further includes a first common header connected to all of said recuperator means on one side of said furnace for supplying preheated combustion air to burner stations on said one side, and a second common header connected to all of said recuperator means on the other side of said furnace for supplying preheated combustion air to burner stations on said other side.

5. Apparatus as defined in claim 3 in which each of the first-mentioned plurality of burner stations is aligned with one of said second plurality of burner stations across the heating chamber.

6. In a tank-type glass-melting furnace wherein said furnace includes sidewalls, end walls, a top wall and a bottom wall defining a channel in which batch materials are melted to form a stream of molten glass that flows from a batch charge area in one end wall to a molten glass discharge area in the other end wall; a plurality of burner stations spaced along one of said sidewalls; exhaust port means for each burner station formed in said one sidewall above its associated burner station and aligned therewith whereby a flow pattern for substantially all of the combustion products from each burner station is established out in a first current over the glass in the heating chamber and up and back over the first current in a second current to the exhaust port means in the sidewall above that burner station; and recuperator means for each exhaust port means including a first chamber for receiving combustion products from an exhaust port means and a second chamber in heat exchange relationship with said first chamber for preheating combustion air for said burner stations.

7. Apparatus as defined in claim 6 which further includes a common header connected to said second chambers of said recuperator means for supplying preheated combustion air to said burner stations.

8. Apparatus as defined in claim 7 in which said common header is connected to supply combustion air to a burner station, substantially all of which has been preheated by exhaust combustion products from that burner station to correlate the temperature of the preheated combustion air with the amount of heat desired to be supplied to the furnace by that burner station.

9. Apparatus as defined in claim 6 which further includes a second plurality of burner stations spaced along the other of said sidewalls; exhaust port means for each of said second plurality of burner stations formed in said other side wall above its associated burner station and aligned therewith whereby a flow pattern for substantially all of the combustion products from each of said second plurality of burner stations is established from a burner station out in a first current over the glass in the heating chamber and up and back over the first current in a second current to the exhaust port means in the sidewall above that burner station; and recuperator means for each of said exhaust port means for each of said second plurality of burner stations including a first chamber for receiving combustion products from an exhaust port means and a second chamber in heat exchange relationship with said first chamber for preheating combustion air for said burner stations.

10. Apparatus as defined in claim 9 which further includes a first common header connected to receive preheated combustion air from all of said recuperator means on one side of said furnace and supply combustion air to burner stations on said one side; and a second common header connected to receive preheated combustion air from all of said recuperator means on the other side of said furnace and supply combustion air to burner stations on said other side; each common header being connected to circulate combustion air to a burner station which has received substantially all of its preheat from a heat exchange with exhaust combustion products from the same burner station.

11. Apparatus as defined in claim 9 in which each of the first-mentioned plurality of burner stations is paired with and positioned substantially directly across from one of aid second plurality of burner stations so that the flow patterns from each pair of burner stations define a heating zone across said channel.

12. Apparatus as defined in claim 11 which further includes control means for each burner station for regulating the temperature of each of said zones.

13. Apparatus as defined in claim 9 which further includes means for selectively blocking flow of exhaust combustion products and combustion air through each recuperator means to enable repair or maintenance thereof without shutting down the furnace.

14. A firing system adaptable for use with a furnace which requires a plurality of burners comprising a. a burner station for disposition through a wall of a furnace,
b. individual recuperator means for said burner station, and
c. exhaust port conduit means having a combustion products receiving end disposed above said burner station for conducting combustion products from that burner station to the individual recuperator means for that burner station,
d. said combustion products receiving end of said conduit means being aligned with its associated burner station whereby a flow pattern for substantially all of the combustion products from the associated burner station is established out in a first current from the burner station and up and back over the first current in a second current to said conduit means.

15. A firing system adaptable for use with a furnace which requires a plurality of burners comprising,
a. a plurality of aligned burner stations for disposition along and through one wall of a furnace,
b. individual recuperator means for each of said burner stations, and
c. exhaust port conduit means for each of said plurality of burner stations for conducting combustion products from its associated burner station to the recuperator means individual to that station,
d. each exhaust port conduit means having a combustion products receiving end disposed above and aligned with its associate burner station whereby a flow pattern for substantially all of the combustion products from its associated burner station is established out in a first current from the burner station and up and back over the first current in a second current to said conduit means.

16. A firing system adaptable for use with a furnace which has opposing walls and requires a plurality of burners comprising,
a. a pair of opposed burner stations for disposition through opposing walls of a furnace,
b. individual recuperator means for each of said burner stations, and
c. exhaust port conduit means for each of said plurality of burner stations for conducting combustion products from its associated burner station to the recuperator means individual to that station,
d. each exhaust port conduit means having a combustion products receiving end disposed above and aligned with its associated burner station whereby a flow pattern for substantially all of the combustion products from its associated burner station is established out in a first current from the burner station and up and back over the first current in a second current to said conduit means.

* * * * *